United States Patent [19]
Tsukamoto

[11] Patent Number: 5,328,257
[45] Date of Patent: Jul. 12, 1994

[54] HYDRAULIC BRAKE ACTUATOR

[75] Inventor: Masahiro Tsukamoto, Yokosuka, Japan

[73] Assignee: Nissan Motor Co., Ltd., Yokohama, Japan

[21] Appl. No.: 872,857

[22] Filed: Apr. 23, 1992

[30] Foreign Application Priority Data

Apr. 24, 1991 [JP] Japan .................. 3-119100

[51] Int. Cl.⁵ .............................................. B60T 8/42
[52] U.S. Cl. .................. 303/115.2; 303/117.1
[58] Field of Search .......... 303/115.2, 113.1, 115.1, 303/115.3, 115.4, 117.1, 113.2

[56] References Cited

U.S. PATENT DOCUMENTS

| | | | |
|---|---|---|---|
| 3,549,210 | 12/1970 | Birge et al. | 303/115.2 |
| 3,953,082 | 4/1976 | Smith | 303/115.6 X |
| 4,653,815 | 3/1987 | Agarwal et al. | 303/115.2 X |
| 4,915,459 | 4/1990 | Hashida et al. | 303/117.1 X |
| 5,018,797 | 5/1991 | Takata | 303/117.1 |
| 5,029,950 | 7/1991 | Vennemeyer et al. | 303/115.2 X |
| 5,161,865 | 11/1992 | Higashimata et al. | 303/115.2 |

FOREIGN PATENT DOCUMENTS

| | | | |
|---|---|---|---|
| 88651 | 4/1987 | Japan | 303/115.2 |
| 3008058 | 1/1988 | Japan | 303/115.2 |
| 3212159 | 9/1988 | Japan | 303/117.1 |
| 3220052 | 9/1991 | Japan | 303/115.2 |
| 4-151355 | 4/1992 | Japan . | |

Primary Examiner—Robert J. Oberleitner
Assistant Examiner—Alfred Muratori
Attorney, Agent, or Firm—Lowe, Price, LeBlanc & Becker

[57] ABSTRACT

A hydraulic brake actuator for use in an automobile brake system which includes a master cylinder to be operated by a driver and a wheel cylinder connected to the master cylinder through a hydraulic circuit for applying a braking force to a wheel. The actuator is capable of performing anti-skid control function and/or traction control function, and includes a control cylinder device having a chamber which is connected to the wheel cylinder and adapted to be selectively connected to the master cylinder and disconnected therefrom. A piston is axially displaceably accommodated in the chamber for changing the volume of the chamber. A valve device has inlet and outlet ports connected to the master cylinder and the chamber, respectively, and is operatively connected to the piston so as to be opened or closed in response to the displacement of the piston.

5 Claims, 7 Drawing Sheets

FIG_1

FIG_3

FIG_8
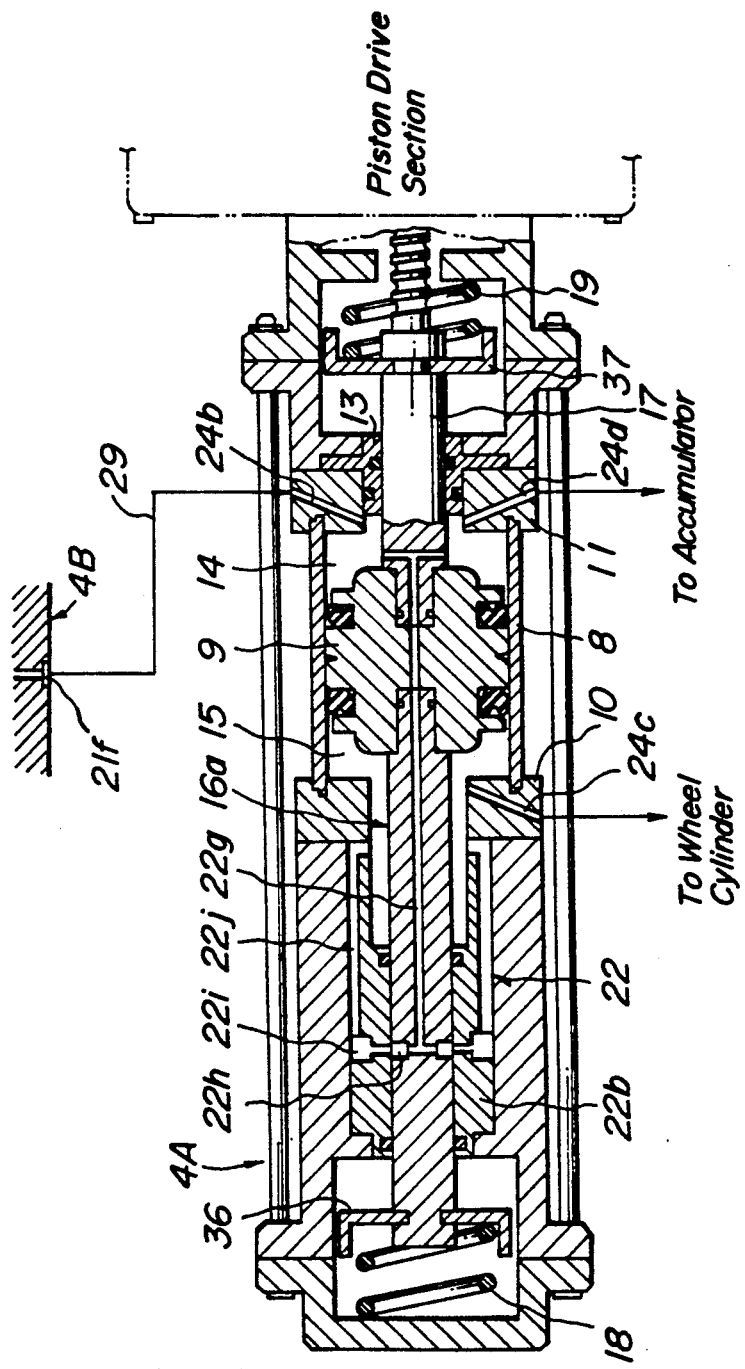

HYDRAULIC BRAKE ACTUATOR

BACKGROUND OF THE INVENTION

1. Field of the Invention

The present invention relates to a hydraulic brake actuator for use in a braking force control system of an automotive vehicle.

2. Description of the Related Art

This type of brake actuator is generally interposed in a hydraulic circuit connecting a master cylinder to be operated by a driver of an automotive vehicle and a wheel cylinder associated with a vehicle wheel, for controlling the braking fluid pressure to be applied to the wheel cylinder.

The applicant has already proposed a hydraulic brake actuator which is capable of performing anti-skid control function and/or traction control function, and which can be designed to avoid a bulky overall arrangement of the actuator and, in particular, to have a compact arrangement of the piston drive section, such as an electric motor. Such a brake actuator is disclosed, e.g. in Japanese Patent Application No. 2-275,260 which has not been laid-open for public inspection as of the priority date of this application.

With the brake actuator according to the above-mentioned proposal, as for the anti-skid control function, when the wheel of an automotive vehicle exhibits a slipping tendency due to an excessive braking force, two valves are controlled in accordance with information relating to the slipping condition. That is, an electromagnetically operated first valve is opened to interrupt the communication between the master cylinder and two chambers which are defined by a piston in a control cylinder. Subsequently, a similarly electromagnetically operated second valve is closed to interrupt the communication between the two chambers of the control cylinder and maintain these chambers at the wheel cylinder pressure at the instance of occurrence of the slipping. Then, the piston is applied with a thrust by a driving motor to increase the volume of the chamber in the control cylinder on the side of the wheel cylinder and decrease the wheel cylinder pressure, for performing the desired anti-skid control function and suppressing the wheel slipping.

The driving force required for driving the piston corresponds to the force used to reduce the pressure within the chamber of the control cylinder on the side of the wheel cylinder, from the pressure value at the instance of occurrence of slipping to a lower pressure value which allows suppression of the slipping so that it is possible to minimize the capacity of the driving motor.

On the other hand, as for the traction control function which is performed upon occurrence of a wheel spinning due to an excessive driving force, only the second electromagnetically operated valve is closed and the piston is applied with a thrust so as to decrease the volume of the chamber in the control cylinder on the side of the wheel cylinder and increase the wheel cylinder pressure, for applying an increased braking force to the wheel and performing the desired traction control function.

The above-mentioned arrangement according to the applicant's earlier proposal proved to be highly advantageous in that a single actuator could be used to perform the anti-skid control function and in addition the traction control function, with a compact drive motor for the piston. Nevertheless, this brake actuator could be further improved without the sacrifice of the above-mentioned advantages.

The anti-skid control function, for example, requires two electromagnetic driver devices for the two valves and one driver device for applying the thrust to the piston, whereas it is desirable to reduce the total number of driver devices and minimize the size, weight, energy consumption, manufacturing cost, etc. Particularly, when it is required to provide a brake actuator for each wheel of an automobile vehicle, as is the case in a 4-channel anti-skid control and/or traction control for a 4WD vehicle, it is highly desirable to further simplify the overall arrangement and lower the manufacturing cost of the individual actuator while simultaneously maintaining the above-mentioned advantages of the arrangement according to the applicant's earlier proposal.

SUMMARY OF THE INVENTION

It is a primary object of the present invention to provide an improved hydraulic brake actuator which makes it possible to simplify the overall arrangement and lower the manufacturing cost.

Briefly stated, the present invention provides a hydraulic brake actuator for use in a brake system of an automotive vehicle, which includes a master cylinder to be operated by a driver and a wheel cylinder connected to the master cylinder through a hydraulic circuit for applying a braking force to a wheel.

The brake actuator according to the present invention is interposed in the hydraulic circuit and comprises a control cylinder device having a chamber which is connected to the wheel cylinder and which can be selectively connected to the master cylinder and disconnected therefrom, and a piston axially displaceably accommodated in the chamber for changing the volume of the chamber.

The brake actuator according to the present invention further comprises a piston driver device for causing an axial displacement of the piston, and a valve device having an inlet port connected to the master cylinder and an outlet port connected to the chamber, and operatively connected to the piston of the control cylinder device so as to be opened or closed in response to the displacement of the piston.

With the brake actuator according to the present invention, it is possible to perform a desired anti-skid control function and in addition a traction control function, essentially in the same manner as the brake actuator according to the applicant's earlier proposal as mentioned above. On this occasion, the axial displacement of the piston of the control cylinder device is induced by the piston driver device. Such displacement of the piston results not only in change in the volume of the chamber within the control cylinder device, which is connected to the wheel cylinder, but also in the opening or closure of the valve device which is interposed between the master cylinder and the chamber within the control cylinder device, since the valve device is operatively connected to the piston.

The valve device according to the present invention does not by itself require a solenoid or the like electromagnetic driver device, so that it is possible to simplify the overall arrangement of the brake actuator and minimize the size, weight, energy consumption, manufacturing cost, etc., and to carry out the desired control with an improved response characteristic.

The present invention will be explained in further detail hereinafter, by referring to some preferred embodiments shown in the accompanying drawings.

BRIEF DESCRIPTION OF THE DRAWINGS

FIG. 8 is a longitudinal-sectional view similar to FIG. 2, showing the brake actuator according to another embodiment of the present invention.

DETAILED DESCRIPTION OF THE PREFERRED EMBODIMENT

Figure 1:
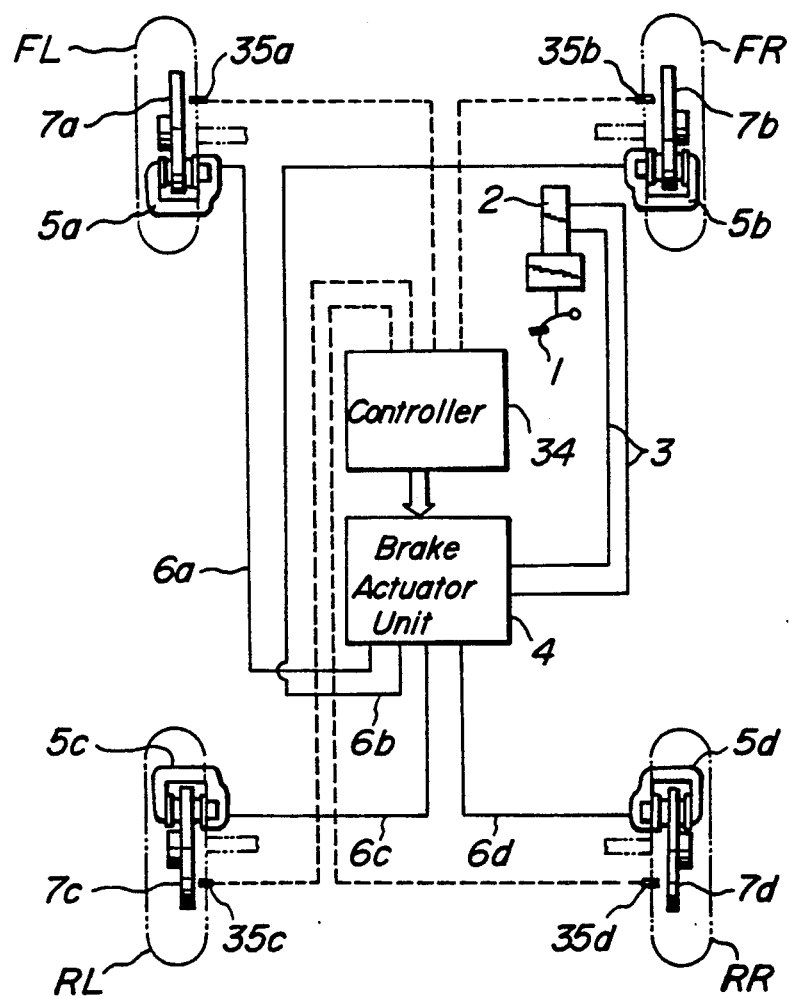
FIG. 1 is a diagram showing one example of a braking force control system to which the actuator according to the present invention is applicable.

Referring now to FIG. 1, there is shown one example of a braking force control system for an automotive vehicle, to which the present invention can be applied. The vehicle includes left and right front wheels $F_L$, $F_R$, left and right rear wheels $R_L$, $R_R$, a brake pedal 1, a master cylinder 2 for supplying to master cylinder pressure passages 3 a master cylinder pressure $P_M$ which depends upon a brake pedal depression force, and a brake actuator unit 4 in accordance with the present invention. The wheels $F_L$, $F_R$, $R_L$, $R_R$ are associated with wheel cylinders 5a, 5b, 5c, 5d for braking the respective wheels. Thus, the actuator unit 4 serves to control the master cylinder pressure $P_M$ to generate respectively predetermined pressures which are supplied to the wheel cylinders 5a, 5b, 5c, 5d via braking pressure passages 6a, 6b, 6c, 6d. By this, braking forces are applied to braking discs 7a, 7b, 7c, 7d which are put into rotation together with the respective wheels $F_L$, $F_R$, $R_L$, $R_R$.

The brake actuator unit 4 constitutes the braking force control system together with a control unit to be described hereinafter, and is formed of at least one brake actuator including a valve device and an actuator body. The valve device includes first and second valves which may be interposed in a fluid pressure passage extending between the master cylinder and the wheel cylinder, while the actuator body includes a pressure control cylinder. Insofar as the anti-skid control is concerned, the braking force control system in the illustrated example is of a 4-channel 4-sensor type, so that the brake actuator unit 4 is formed of four brake actuators which are provided in the braking pressure passages 6a, 6b, 6c, 6d for the respective wheels $F_L$, $F_R$, $R_L$, $R_R$.

Figure 2:
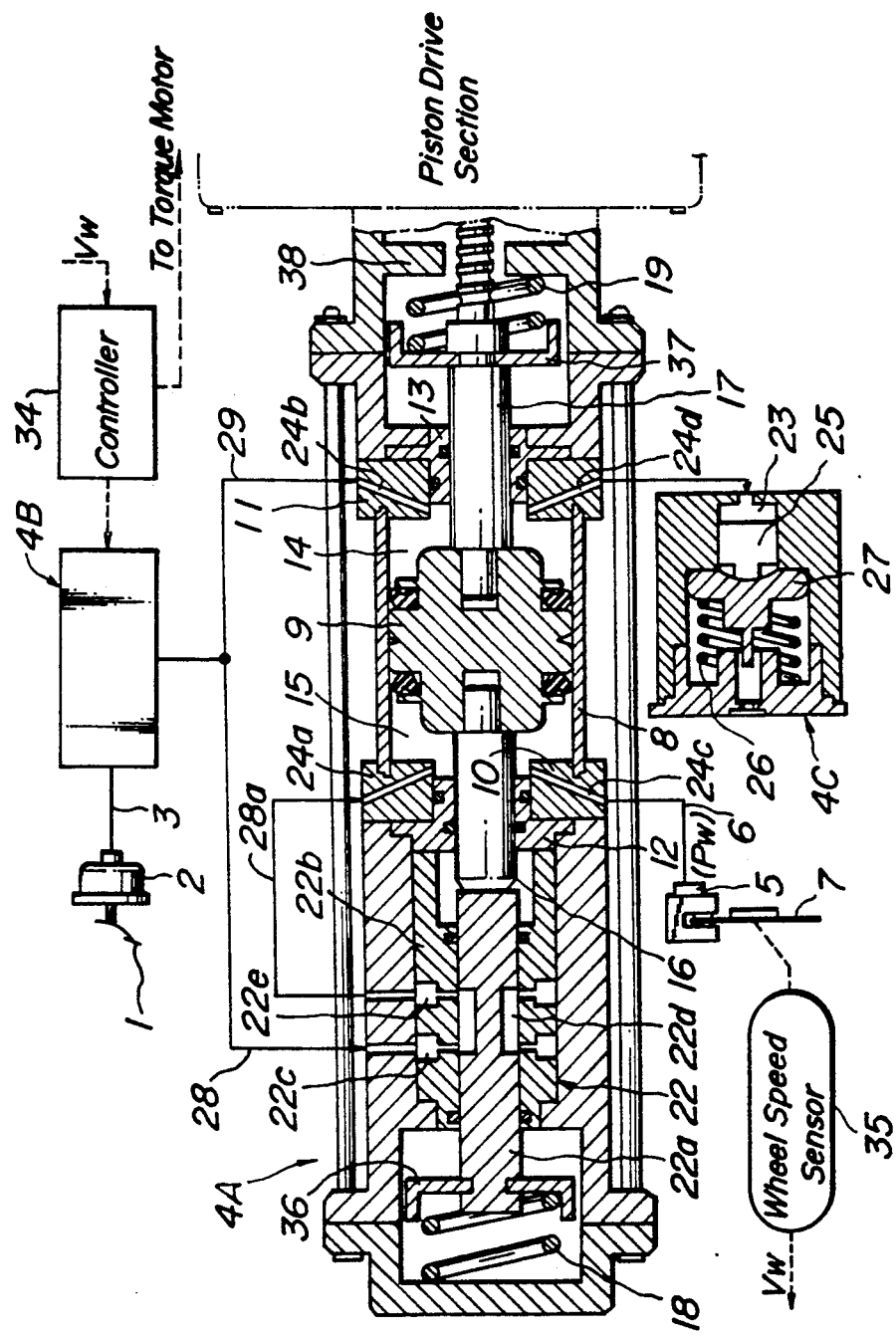
FIG. 2 is a longitudinal-sectional view showing the brake actuator according to one embodiment of the present invention.
Figure 3:
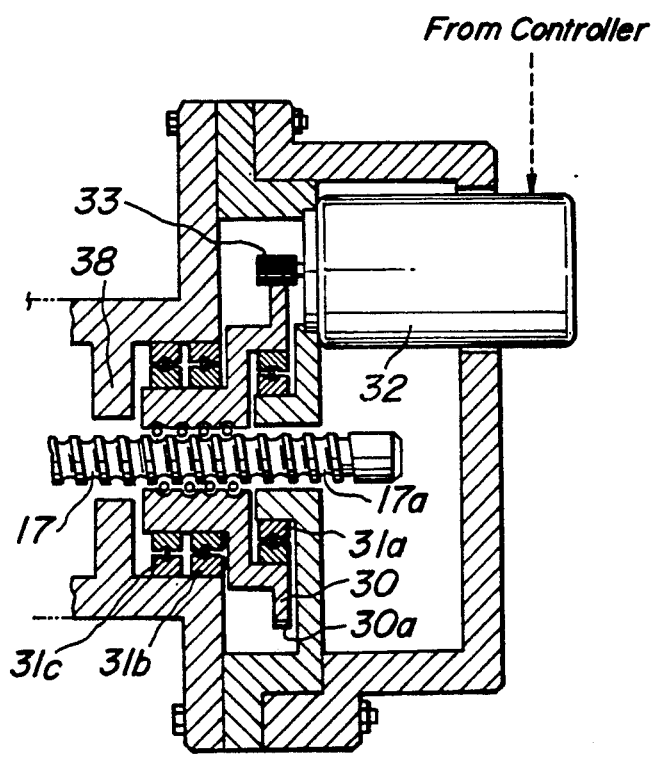
FIG. 3 is a fragmentary sectional view showing the detail of the piston driver section of the brake actuator.

FIGS. 2 and 3 show one example of the structure of a brake actuator for controlling the fluid pressure for one channel, forming the brake actuator unit 4 which can be used in the above-mentioned braking force control system.

The brake actuator includes an actuator body 4A, an electromagnetically operated valve section 4B as a first valve 20 (see FIG. 4), and an accumulator 4C connected to a first chamber in the pressure control cylinder of the actuator body 4A, which will be explained hereinafter. The brake actuator further includes a piston driver section (FIG. 3) for axially driving the piston 9 in the actuator body 4A, which will also be explained hereinafter. In the illustrated embodiment, a second valve 22 is incorporated in the actuator body 4A, which can be operated in accordance with the displacement of the piston 9.

The actuator body 4A is connected to the valve section 4B via passages 28, 29 which are branched from a common passage, and has a second chamber in the control cylinder as will be explained hereinafter, which is connected to a wheel cylinder 5 of a brake unit which also includes a brake disc 7.

The valve section 4B and a torque motor 32 (FIG. 3) forming part of the piston driver section are controlled by a controller 34 including a microprocessor which executes a control program for controlling various elements for each channel.

On the contrary, the second valve incorporated in the actuator body 4A is not operated by the controller. More particularly, the second valve 22 may be in the form of a spool valve, for example, having a valve spool which is slidable integrally with the piston, and a plurality of ports which are connected with each other in a neutral position of the spool, and disconnected from each other when the valve spool is slightly moved from the neutral position. One of the ports may be connected to either the first valve or the second chamber of the control cylinder, and another port may be connected to the second chamber of the control cylinder.

The arrangement of the brake actuator will be further explained below by referring to FIG. 4 which shows one example of the valve section 4B in the brake actuator, and also to FIG. 5 which shows the operation of the valve section 4B wherein the first valve 20 is applied with a control current.

As shown in FIG. 2, the actuator body 4A includes a pressure control cylinder 8 in which a piston 9 is axially slidably arranged. The control cylinder 8 has its axial ends closed by end covers 10, 11 and seal bearings 12, 13, respectively, to define a first chamber 14 and a second chamber 15 on both sides of the piston 9. The piston 9 is provided with piston rods 16, 17 on its axial end surfaces, which are respectively sealed by, and slidably passed through the seal bearings 12, 13. The piston rods 16, 17 are applied with axial spring forces by compression springs 18, 19, respectively, which are directed in mutually opposite directions. The spring 18 acts on the piston rod 16 through the spool of the second valve, while the spring 19 acts on the piston rod 17 directly. These springs 18, 19 serve to resiliently maintain the piston 9 in its neutral position shown in FIG. 2, and to induce return motion of the piston 9 to the neutral position when the input to the piston actuator section becomes zero, as will be explained hereinafter.

The first chamber 14 in the control cylinder 8, which is on the right side of the piston 9 in FIG. 2, is connected to the accumulator 4C and also to the master cylinder pressure passage 3 via the first valve 20 which forms the valve section 4B. The second chamber 15 in the control cylinder 8, which is on the left side of the piston 9 in FIG. 2, is connected to the braking pressure passage 6 leading to the wheel cylinder 5, and also to the master cylinder pressure passage 3 via the first valve 20 of the valve section 4B and the second valve 22 incorporated in the actuator body 4A.

The accumulator 4C includes a chamber 23 which is connected to one of ports 24a, 24b, 24c, 24d formed in the actuator body 4A, i.e. the port 24d. The accumulator 4C further includes a piston 25, a compression spring 26 and a spring seat member 28. When the working fluid from the first chamber 14 is introduced into the accumulator 4C, the piston 25 is moved leftwardly in FIG. 2, compressing the spring 26 thereby absorbing the pressure fluctuation in the first chamber 14.

In the embodiment shown in FIG. 2, during the operation mode wherein the first valve 20 is maintained closed by means of the controller 34, the first valve 20 prohibits flow of the working fluid from the master cylinder 2 toward the control cylinder, and permits flow of the working fluid in the opposite direction, i.e. toward the master cylinder 2. Alternatively, however, it is also possible to use a normally-open type electromagnetic valve as the first valve 20, wherein a solenoid-operated plunger is arranged within a valve body. The plunger may then be normally maintained in its open position by a spring in a deenergized state of the solenoid, and attracted by the solenoid so that the tip end of the plunger is urged against the valve seat member when the solenoid is energized.

Figure 4:
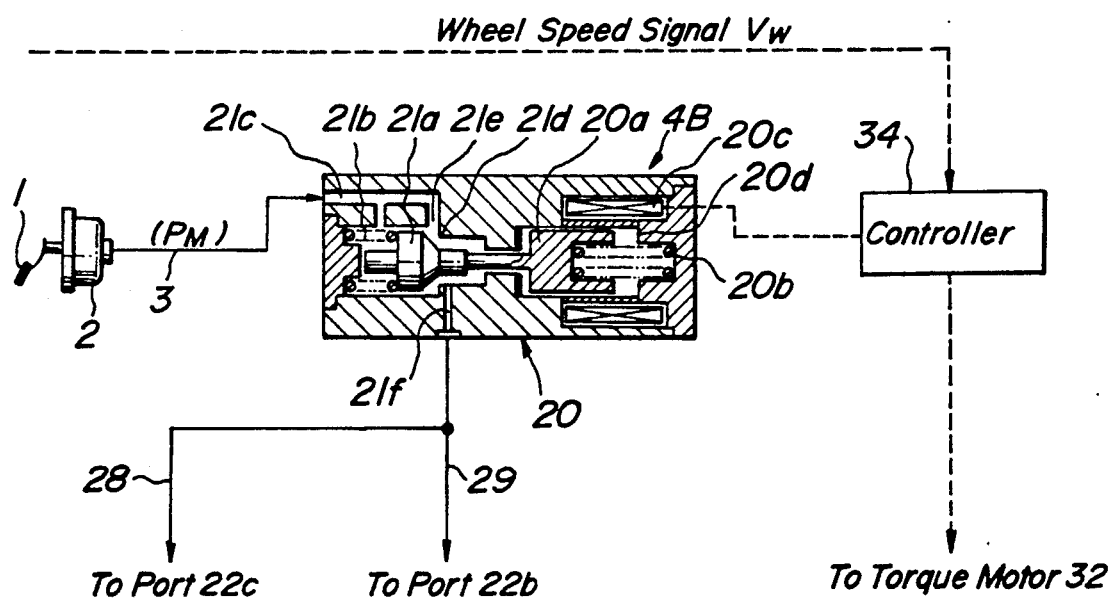
FIG. 4 is a sectional view showing one example of the valve section in the brake actuator.

The first valve 20 may be an operated-type check valve as shown in FIG. 4, which can also be operated either by supplying electric current to a solenoid, or by stopping the current supply thereto. The check valve forming the first valve 20 is arranged so as to permit flow of the working fluid from the control cylinder toward the master cylinder 2, and to prohibit flow of the working fluid in the opposite direction. To this end, the first valve 20 has a housing which accommodates therein an axially slidable plunger 20a which is urged by a compression spring 20b toward left in FIG. 4, and a poppet valve element 21a which, in turn, is urged by a compression spring 21b toward right in FIG. 4 and brought into abutment with the left end of the plunger 20a in the normal position shown in FIG. 4. The spring force of the spring 21b is made smaller than that of the spring 20a so that the plunger 20a urges the poppet valve element 21a toward left, against the force of the spring 21b. In such a position of the poppet valve element 21a, the check valve assumes an open state so that the master cylinder pressure passage 3 connected to the master cylinder 2 is communicated with the passages 28, 29 via an inlet port 21c, a port 21e formed between the valve element 21a and a valve seat 21d, and an outlet port 21f of the popper valve. In this connection, the distance $L_1$ between the valve element 21a and the valve seat 21d is made smaller than the displacement $L_2$ of the plunger 20a from the position shown in FIG. 4 ($L_1 < L_2$).

The first valve 20 assumes an open position in the OFF state of the solenoid 20c wherein it is not supplied with electric current from the controller 34 and is thus deenergized. When the solenoid 20c is supplied with electric current from the controller 34 and is thereby energized (ON state), the plunger 20a is displaced by the amount $L_2$ to its right side extreme position shown in FIG. 5, which is defined by the inner end wall 20d of the housing. On this occasion, since the distance $L_1$ between the valve element 21a and the valve seat 21d is made smaller than the displacement $L_2$ of the plunger 20a, the poppet valve element 21a is disengaged from the plunger 20a and closes the port 21e and blocks the communication between the ports 21c and 21f, as shown in FIG. 5. In the position shown in FIG. 5, the first valve functions as a usual, nonoperated type check valve.

Figure 5:
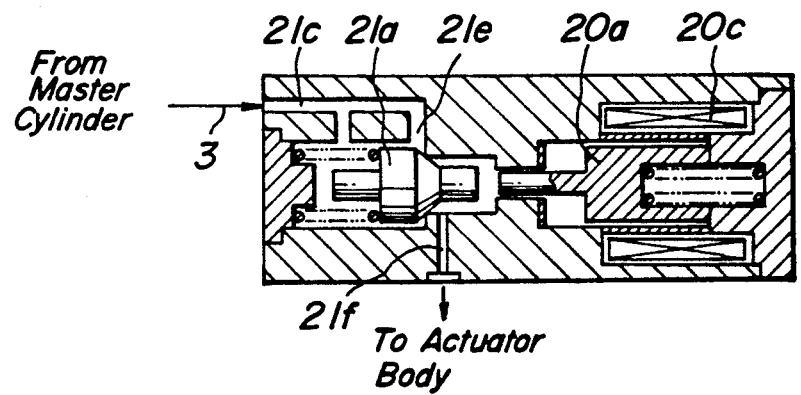
FIG. 5 is a sectional view showing the operation of the valve section wherein the first valve is applied with a control current.

In the manner described above, the first valve 20 is closed in the energized state (ON state) of the solenoid 20c wherein the poppet valve element 21a is urged toward right in FIG. 5 by a differential pressure when the pressure at the port 21c on the master cylinder side is higher than the pressure at the port 21f on the side of the second valve 22, to block the communication between the ports 21c and 21f and maintain a self-closure position. Furthermore, when the the pressure at the port 21f on the side of the second valve 22 is higher than the pressure at the port 21c on the master cylinder side, the poppet valve element 21a is retracted from the position shown in FIG. 5 toward left, so that the ports 21c and 21f are maintained in communication with each other even when the solenoid 20c is energized.

The port 21f of the first valve 20 is connected on one side with the second valve 22 incorporated in the actuator body 4A, via the passage 28. The second valve 22 is formed as a spool valve including a valve spool 22a and a sleeve 22b for slidably accommodating the valve sleeve 22a therein. The valve spool 22a has one end (right side in FIG. 2) which is in engagement with the piston rod 16 of the piston 9.

The valve sleeve 22b is formed with a port 22c connected to the passage 28, and another port 22e which is connected, via another passage 28a, to the port 24a of the second chamber 15 in the control cylinder. The valve spool 22a has an annular chamber 22d defined between a small diameter portion of the valve spool 22a and the inner circumferential wall of the sleeve 22b. The annular chamber 22d establishes communication between the ports 22c, 22e when the valve spool 22a assumes the neutral position as shown in FIG. 2, and blocks such communication when the spool 22a is axially moved from the neutral position.

The valve spool 22a has another end (left side in FIG. 2) which is provided with a spring seat 36. The above-mentioned compression spring 18 is arranged between the spring seat 36 and the end cover wall of the actuator body 4A, to urge the spool 22a (and hence, the piston 9 via the piston rod 16) toward right in FIG. 2. Another spring seat 37 is provided for the piston rod 17, and the above-mentioned compression spring 19 is arranged between the spring seat 37 and an annular wall 38 of the actuator body 4A, to urge the piston 9 toward left in FIG. 2.

Such an arrangement ensures that, when the piston 9 is axially moved, the spool 22a moves integrally with the piston 9 while when the piston driving force becomes zero and the piston 9 returns to the neutral position shown in FIG. 2, the valve spool 22a is caused by the compression springs 18, 19 to return to its neutral position. Thus, the opening and closure of the second valve 22 are effected by the axial movement of the piston 9.

The port 21f of the first valve 20 is connected to the second valve 22 via the passage 28, as mentioned hereinbefore. The port 22c of the second valve 22, which is connected to the passage 28, is connected to the second chamber 15 in the control cylinder 8, via the annular chamber 22d, the port 22e, the passage 28a and the port 24a. The second chamber 15 is connected to the wheel cylinder via the port 24c. The port 21f is also connected to the first chamber 14 in the pressure control cylinder 8, via the passage 29 and the port 24b. (The first chamber 14 is also connected to the port 22c of the second valve 22.) As mentioned hereinbefore, the first chamber 14 is connected to the accumulator 4C.

While the first valve 20 in the illustrated embodiment is formed separately from the actuator body 4A, it is of course possible to form them as an integral assembly.

As shown in FIGS. 2 and 3, the piston rod 17 provided for the piston 9 within the pressure control cylinder 8 has a tip end region formed as a ball screw 17a. The ball screw 17a is threadedly engaged with a ball nut 30 which is rotatably, but axially fixedly supported by bearings 31a, 31b, 31c. The ball nut 30 has an outer peripheral portion which is provided with outer teeth. The piston actuator section for actuating the piston 9 in the actuator body 4A includes a reversible torque motor 32 having an output pinion 33 which is in mesh with the outer teeth of the ball nut 30. The ball screw 17a and the ball nut 30 jointly form a torque/thrust conversion mechanism for converting the output rotation of the torque motor 32 into a thrust to be applied to the piston 9. In operation, the thrust to be applied to the piston 9 is controlled to have such a magnitude as to establish an equilibrium of the thrust applied by the torque motor 32 and a differential pressure across the first and second chambers 14, 15 on both sides of the piston 9.

The brake actuator having the above-mentioned structure according to the present invention is interposed in a braking pressure fluid circuit of a desired channel to be controlled. The controller 34 serves to control the operation of the first valve 20 and determine the magnitude of a command to be supplied to the torque motor 32 for generating a thrust to axially drive the piston 9. The controller 34 is supplied with various input signals, such as a signal from a wheel speed sensor 35 for detecting the peripheral speed Vw of a wheel. In the case of 4-channel 4-sensor type system as shown in FIG. 1, four wheel speed sensors 35a, 35b, 35c, 35d are connected to the controller 34.

The controller 34 includes input terminals connected to the sensors, a processing circuit (CPU), a memory circuit for storing the control program to be executed by the processing circuit, and output terminals for supplying command signals to the solenoid of the first valve 20, etc.

The controller 34 performs a braking force control function in accordance with a slipping or spinning state of the relevant wheel. In this instance, the first valve 20 formed as an operated-type check valve is controlled so that the first valve 20 is closed as the detected slipping condition of the wheel exceeds a predetermined criterion, and is opened as the command signal to be supplied to the torque motor 32 either becomes zero or causes the volume of the second chamber 15 to decrease.

The second valve 22 is operated in accordance with the axial displacement of the piston 9 in the pressure control cylinder 8, as mentioned above, and thus assumes an open position only when the command signal to be supplied to the torque motor 32 is substantially zero. Accordingly, the second valve 22 by itself does not require any electromagnetic operation.

The controller 34 determines the magnitude of the command signal to be supplied to the torque motor 32 so as to maintain an optimum slipping state or an optimum spinning state of the wheel. Furthermore, when the command signal requires a decreased volume of the second chamber 15 in the control cylinder 8, or requires an increased volume of the second chamber 15, the command signal is caused to be zero.

Preferably, the braking force control is carried out so as to open the first valve 20 also when the wheel slipping state does not reach a predetermined criterion.

Figure 6:
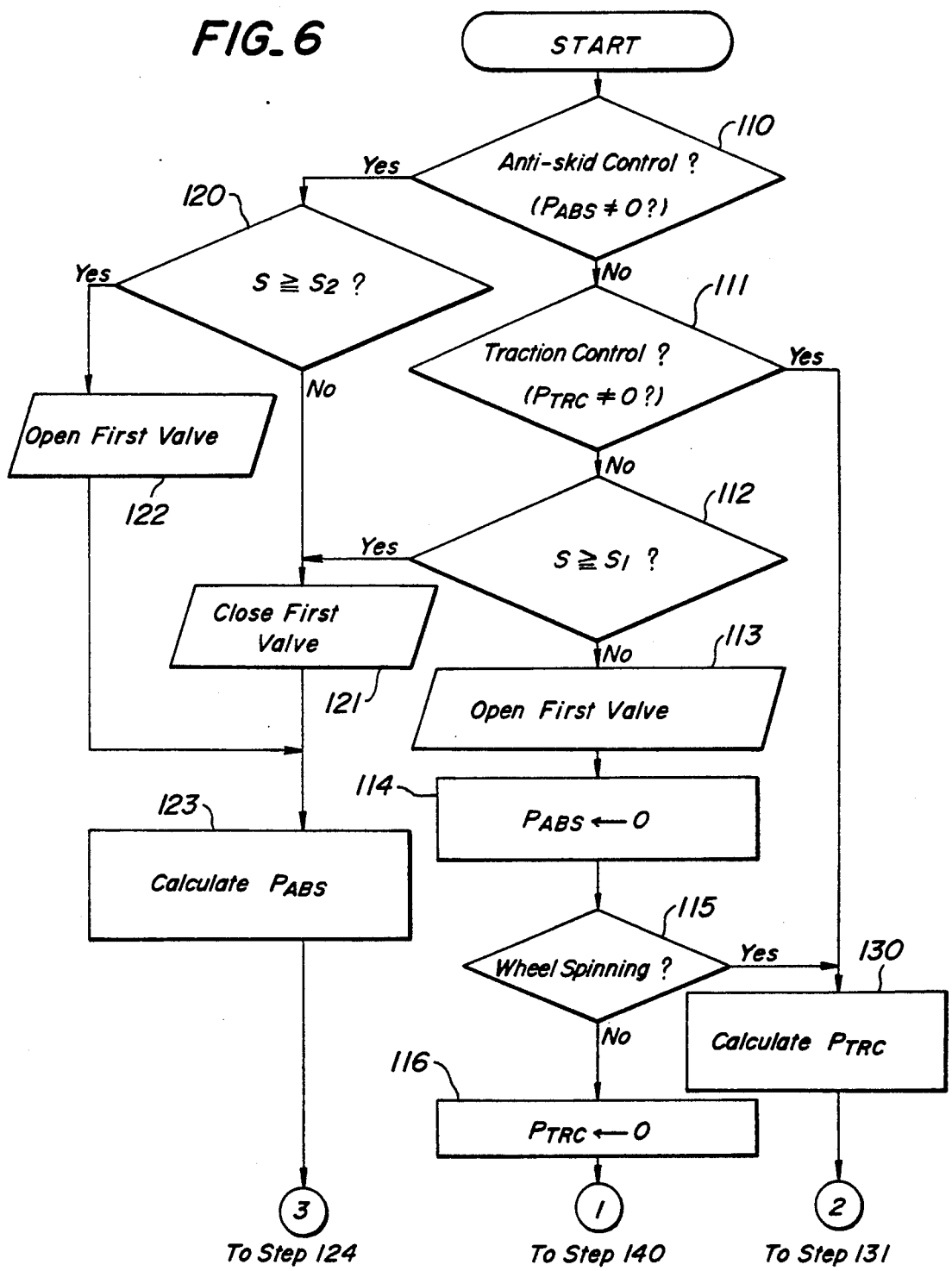
FIGS. 6 and 7 are flow charts showing one example of the control program performed by the controller unit.
Figure 7:
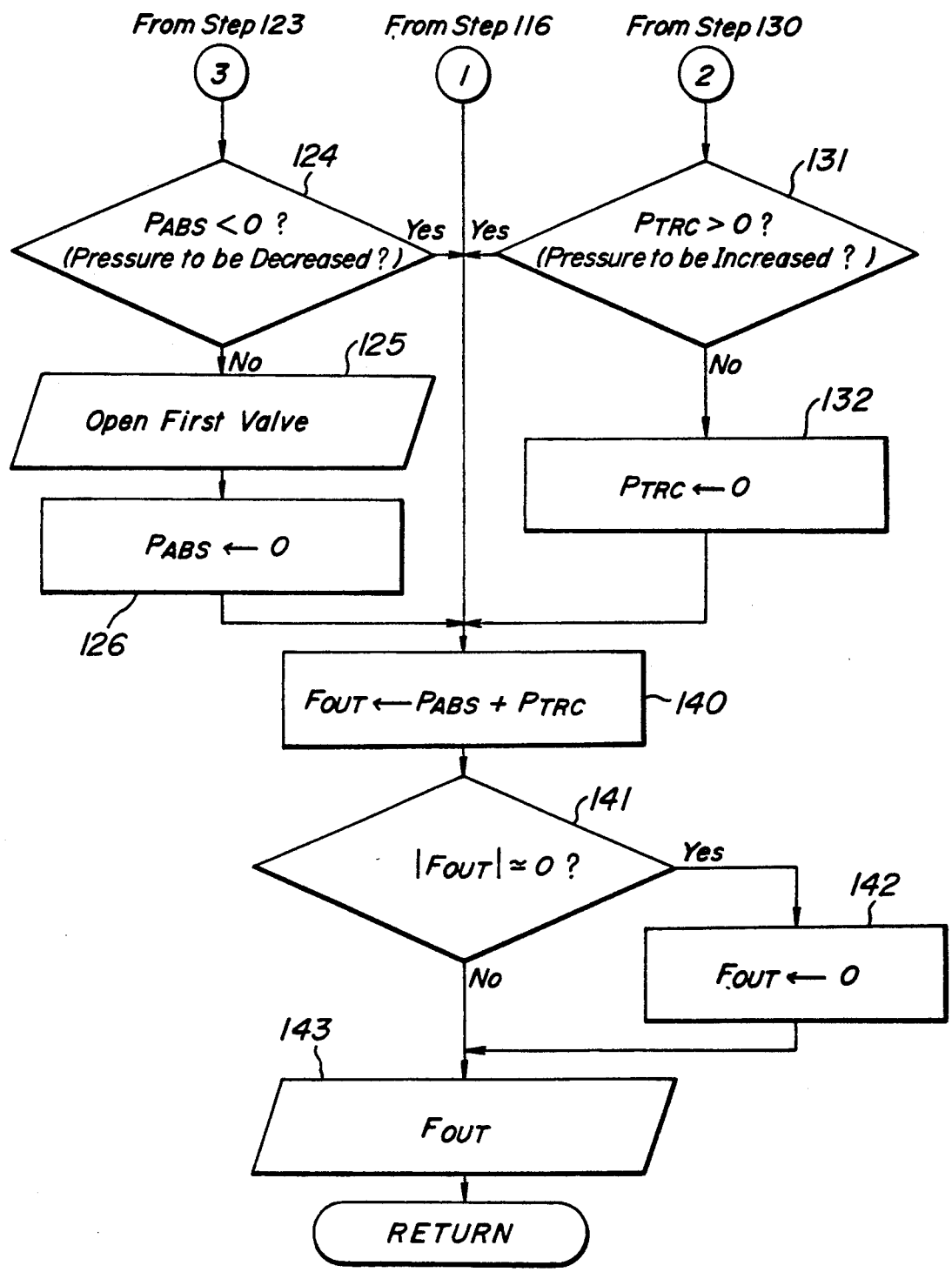

FIGS. 6 and 7 show one example of the control program to be executed by the controller 34. The control program is executed periodically, with a predetermined time interval. This control program is to perform not only the anti-skid control function (ABS function), but also a traction control function (TRC function), so that it is for a driving wheel (e.g., a rear wheel). As will be explained hereinafter, the anti-skid control is related to a pressure value "$P_{ABS}$" and the traction control is related to a pressure value "$P_{TRC}$".

The control program includes a step 110 for determining whether an anti-skid control function is being performed, and another step 111 for determining whether a traction control function is being performed. The determination at the step 110 can be made by monitoring whether the $P_{ABS}$ value is not zero, and the determination at the step 111 can similarly be made by monitoring whether the $P_{TRC}$ value is not zero.

When the result of determination at the step 110 is "Yes" ($P_{ABS} \neq 0$), the control goes to a next step 120. Furthermore, when the result of determination at the step 111 is "Yes" ($P_{TRC} \neq 0$), the control goes to a next step 130. The function of these steps 120, 130 will be explained hereinafter. When the result of determination at the step 110 is "No" ($P_{ABS} = 0$) and the result of determination at the step 111 is also "No" ($P_{TRC} = 0$), it is assumed that neither anti-skid control function nor traction control function is being performed so that the control goes to a step 112 and subsequent steps to further determine if these controls are to be initiated. Thus, at the step 112, a determination is made as to whether an actual wheel slipping rate exceeds a predetermined criterion. Based on the wheel speed value Vw and the actual vehicle speed value Vv, the wheel slipping rate S can be calculated by the following formula:

$S = (Vv - Vw)/Vv$

In this case, the actual vehicle speed may be derived from the wheel speed value Vw in a manner known, per se.

When the so determined slipping rate S is no less than a predetermined threshold value $S_1$, the braking force is assumed to cause a wheel slipping state so that the control goes to a step 121 to initiate an anti-skid control routine. On the other hand, if the slipping rate S is found to be less than the threshold value $S_1$, the anti-skid control function is assumed to be unnecessary, so that the first valve 20 is maintained in its open position at a step 113, and set the above-mentioned $P_{ABS}$ value to zero at a step 114 to proceed the control to a step 115 and so forth. The $P_{ABS}$ value is to be understood as being a pressure command value for the anti-skid control, as determined at a step 123 to be described hereinafter, with which the relevant wheel is maintained at an optimum slipping state.

The step 115 is to monitor or determine a wheel spinning state. When the result of the determination at the step 115 is "Yes", or when it has been found at the step 115 that an excessive driving force is being applied to the wheel to cause a wheel spinning, the control goes to a step 130 to initiate a traction control and apply a braking force to the wheel to suppress the wheel spinning. When the result of the determination at the step 115 is "No" the traction control function is assumed to be unnecessary so that the above-mentioned $P_{TRC}$ value is set to zero at a step 116 to proceed the control to a step 140 (FIG. 7) and so forth. The $P_{TRC}$ value is to be understood as being a traction control command value as determined at the step 130, with which the relevant wheel is maintained at an optimum wheel spinning state. More particularly, the $P_{TRC}$ value is a braking pressure value required to maintain an optimum driving state of the wheel by applying a braking force to the wheel and suppressing the wheel spinning.

As shown in FIG. 7, the step 140 in the illustrated embodiment is to set a "$F_{OUT}$" value which is the sum of the $P_{ABS}$ value and the $P_{TRC}$ value ($F_{OUT} = P_{ABS} P_{TRC}$), and to determine a command value for the thrust to be applied to the piston 9. The $F_{OUT}$ value is the desired pressure variation value for the wheel cylinder pressure of the relevant wheel, and assumes a negative sign when the pressure is to be decreased and a positive sign when the pressure is to be increased. As will be discussed hereinafter, the $P_{ABS}$ value of a negative sign during the anti-skid control is a pressure decreasing instruction, and the $P_{TRC}$ value of a positive sign during the traction control is a pressure increasing command.

A determination is further made at a step 141 as to whether the absolute value of the $F_{OUT}$ value is zero or substantially zero. Depending upon the result of the determination at the step 141, the control goes either firstly to a step 142 and subsequently to a step 143, or directly to the step 143. Now that the $P_{ABS}$ value and the $P_{TRC}$ value have been set to zero at the steps 114, 116, respectively, and the control has completed the step 140, the $F_{OUT}$ value is zero so that the result of the determination at the step 141 is "Yes". In this case, the $F_{OUT}$ value is set (or reset) to zero at the step 142, and is then used to derive an output at the step 143 to complete the control program.

The output derived at the step 143 is to provide a control command current to be supplied to the torque motor 32, depending upon the $F_{OUT}$ value at the step 140 (i.e., the thrust command value for the piston 9) or the $F_{OUT}$ value which has been set at the step 142 (=0). In the present case, the current to be supplied to the torque motor 132 is zero since the $F_{OUT}$ value is zero, so that the torque motor 32 is maintained in the OFF state to maintain the second valve 22 in the open position.

During the control along the above-mentioned loop, it is possible to achieve a normal braking operation. Thus, when a normal braking force is applied to a wheel during driving of the vehicle along a straight path, no wheel slipping or spinning occurs and the $P_{ABS}$ value for the anti-skid control and the $P_{TRC}$ value for the traction control are set to zero at the steps 114, 116, respectively. Therefore, the first and the second valves 20, 22 are maintained in the respective open positions (steps 113, 142, 143). Thus, as for the second valve 22, since the thrust to be applied to the piston 9 is zero, the spool 22a is maintained in its neutral position to maintain the ports 22c, 22e in communication with each other. The master cylinder pressure $P_M$ generated by the depression of the brake pedal 1 is transmitted to the wheel cylinder 5 as the braking pressure $P_W$, via the ports 21e, 21f of the first valve 20, via the port 22c, chamber 22d and port 22e of the second valve 22, and further via the second chamber 15 of the control cylinder 8, permitting a normal braking operation to be performed by the master cylinder pressure $P_M$, per se.

The master cylinder pressure $P_M$ is also applied, via the ports 22e, 22f, to the first chamber 14 of the pressure control cylinder 8 and further to the accumulator 4C. On this occasion, the first and second chambers 14, 15 are maintained at a same pressure, and the thrust to be applied to the piston 9 is zero as the torque motor 32 is in the OFF state (steps 142, 143), so that the piston 9 is maintained in its predetermined neutral position by the springs 18, 19, as shown in FIG. 2.

The anti-skid control function is performed during the above-mentioned braking operation wherein the first and second chambers 14, 15 are maintained at the same pressure, by enclosing the pressure within the first and second chambers 14, 15 and by modifying the pressure within the second chamber 15, i.e. the wheel cylinder pressure $P_W$.

The anti-skid control is initiated when the result "Yes" is obtained at the step 112 as to whether the wheel slipping rate S exceeds a predetermined criterion. The slipping rate S is determined in the manner described above, so that a higher slipping rate is the indication of a more intense slipping of the wheel. Thus, when the slipping rate S is in excess of the threshold $S_1$, the wheel cylinder pressure need not be increased beyond the $P_W$ value (=$P_M$ value) at that instance, so that the first valve 20 is closed (step 121). The position of the first valve 20 shown in FIG. 5 is thus achieved, wherein the communication between the master cylinder 2 and the pressure control cylinder 8 is blocked by the poppet valve element 21a.

Subsequently, the $P_{ABS}$ value is calculated at the step 123, as the control command pressure for the anti-skid operation. This calculation is to determine the value with which, starting from the slipping state at the very instance of execution of the step 123, the wheel cylinder pressure is decreased so that the slipping rate S assumes a value between the threshold value $S_1$ and another threshold value $S_3$ which is lower than the threshold value $S_1$($S_1$ $S_3$). The threshold values $S_1$ and $S_1$ are to determine a range in which the actual slipping rate S is maintained near an ideal slipping rate. In other words, as regards the maximum braking effect of the vehicle, the ideal slipping rate has a predetermined range which is defined by an upper limit and a lower limit. For example, the threshold values $S_1$ and $S_3$ may be 0.3 and 0.1, respectively.

Furthermore, with reference to still another threshold value $S_2$ as used at the step 120 in a loop after initiation of the anti-skid control, this threshold value $S_2$ is set to be even smaller than the threshold values $S_1$ and $S_3$ ($S_1 > S_3 > S_2$). In the case of the above-mentioned example, the threshold value $S_2$ may be 0.01.

In the following step 124, a determination is made as to whether the $P_{ABS}$ value calculated at the step 123 is lower than zero ($P_{ABS} < 0$), or as to whether the pressure is to be decreased. When the result of the determination at the step 124 is "No" the control goes to the steps 125, 126. That is, when the $P_{ABS}$ value calculated at the step 123 is no less than zero (i.e., the pressure increasing command), the anti-skid control function is assumed to be unnecessary so that the first valve 20 is opened and the $P_{ABS}$ value is set to zero. When, on the other hand, the result of the determination at the step 124 is "Yes" these steps 125, 126 are skipped and the control goes directly to the step 140.

In this case, the $P_{TRC}$ value is zero during the anti-skid control so that the $F_{OUT}$ value is set at the step 140 to the $P_{ABS}$ value. Thus, the result of the determination at the step 141 is "No", so that the control is completed after execution of the step 143.

Now, the control goes to the anti-skid control routine and proceeds from the step 110 to the step 120 for subsequent loops. Thus, after the initiation of the anti-skid control, the step 120 is executed to determine whether the slipping rate S is below the threshold value $S_2$. If it has been determined at the step 120 that the slipping rate S is less than the threshold value $S_2$, maintenance of the pressure within the perform control cylinder 8 is assumed to be unnecessary so that the first valve 20 is opened (step 122) and controlled until the $P_{ABS}$ value becomes zero. When, on the other hand, it has been determined that the slipping rate S is no less than the threshold value $S_2$, the steps 121, 123, 124, 140, 141, 143 are executed to perform the anti-skid control function. During this control, the piston 9 is moved toward right in FIG. 2 and effects a switchover of the second valve 22 into its closed position.

As for the traction control function, this control is initiated upon detection of a wheel spinning at the step 115 (FIG. 6). Then, the control goes to the step 130 to determine the $P_{TRC}$ value necessary for preventing a wheel spinning and achieving an optimum driving condition. Subsequently, a determination is made at the step 131 (FIG. 7) as to whether the $P_{TRC}$ value is above zero, i.e. as to whether the pressure should be increased. When the $P_{TRC}$ value is no greater than zero and the result of the determination at the step 131 is "No" the traction control function is assumed to be unnecessary so that the $P_{TRC}$ value is set to zero at the step 132 and the control goes to the step 140. When, on the other hand, the $P_{TRC}$ value is above zero and the result of the determination at the step 131 is "Yes" the control goes directly to the step 140

In this manner, when the control proceeds from the step 130 to the step 140, the thrust command value $F_{OUT}$ is set to the above-mentioned $P_{TRC}$ value and the control goes further from the step 141 to the step 143 to complete the control program. Thus, after initiation of the control, i.e. after having once executed a control program along the loop including the step 115, a subsequent traction control is performed from the step 111 to the step 130 and in the sequence of the steps 131, 140, 141 and 143. During this control, the piston 9 is moved toward left in FIG. 2 and also effects a switchover of the second valve 22 into its closed position.

In the case of the traction control, the piston 9 is applied with a thrust in a direction (toward left in FIG. 2) for deriving an increased wheel cylinder pressure. On this occasion, the port 22e is closed so that the working fluid is enclosed in the second chamber 15, to further move the piston 9 toward left in FIG. 2 and increase the wheel cylinder pressure, thereby applying a braking force to the relevant wheel and suppressing the wheel spinning.

The traction control function is performed when wheel spinning occurs as a result of an excessive driving force applied to the relevant wheel. In this case, only the second valve 22 is closed which is responsive to the movement of the piston 9. The piston 9 is applied with a thrust by the torque motor 32 to decrease the volume of the second chamber 15 within the control cylinder 8, i.e. toward left in FIG. 2 when the wheel cylinder pressure is to be increased for applying a braking force to the relevant wheel and suppressing the wheel spinning. On this occasion, due to the non-braking condition of the vehicle, the initial pressure enclosed in the second chamber 15 is zero.

The traction control is terminated when the $P_{TRC}$ value is either zero or a positive value which is substantially zero. Thus, during the traction control, when the control has proceeded to the step 132 as a result of the determination at the step 131, the $P_{TRC}$ value is set to zero so that the control goes to the steps 140, 141, 142 and 143 and escapes from the traction control routine. The second valve 22 returns to the open position due to the return motion of the piston 9.

As explained hereinbefore, the anti-skid control is initiated upon occurrence of a slipping condition due to an excessive braking force applied to a wheel. Thus, for example, during a braking operation on a slippy road, when the relevant wheel undergoes slipping and the actual slipping rate S has been determined to be less than the threshold value $S_1$, the first valve 20 is closed (step 121) in order to prevent increase in the pressure of the first and second chambers 14, 15 within the pressure control cylinder 8. To this end, the solenoid 20c of the first valve 20 is applied with an electric current to attract the plunger 20a and cause the poppet valve element 21a to seat upon the port 21e. This serves to maintain the initial master cylinder pressure within the first and second chambers 14, 15 at the very instance of occurrence of the slipping state. The anti-skid control is performed in such a state to suppress the slipping of the relevant wheel, by applying a thrust to the piston 9 by means of the torque motor 32 so as to increase the volume of the second chamber 15 and thereby decrease the fluid pressure in the wheel cylinder 5. Thus, the control command value $P_{ABS}$ for the pressure required to carry out the anti-skid control is calculated (step 123), and the command value $F_{OUT}$ for the thrust to be applied to the piston 9 is determined (step 140). Then, the piston is moved toward right in FIG. 2, so that the port 22c of the second valve 22 is closed by the valve spool 22a to interrupt the communication between the ports 22c, 22e. While the second chamber 15 is maintained in a condition in which the pressurized fluid is enclosed therein, the pressure within the chambers 14, 15 is not sufficient enough to perform the control, so that the piston 9 is further pulled toward right by the thrust applied thereto. As the piston 9 has moved rightwardly, with the second valve 22 in its closed position, the volume of the second chamber 15 increases to reduce the pressure within the chamber 15, i.e. the wheel cylinder pressure, so as to recover the wheel gripping.

On this occasion, the driving force required for axially driving the piston 9 corresponds to the force used to reduce the pressure within the second chamber 15 of the pressure control cylinder 8 which is situated on the side of the wheel cylinder, from the pressure value at the very instance of occurrence of slipping to a lower pressure value with which the slipping can be suppressed. It is therefore possible to minimize the capacity of the torque motor 32 as the piston driver section. In this connection, the accumulator 4C serves to suppress an increase in the pressure within the first chamber 14 of the control cylinder 8, and to effectively convert the thrust applied to the piston 9 into the pressure within the second chamber 15.

As fully explained hereinbefore, according to the present invention, formation of the second valve 22 as an ON/OFF valve which is operated in response to the movement of the piston 9 makes it readily possible to realize an improved brake actuator which is capable of achieving anti-skid control function and traction control function without a solenoid or the like electromagnetic means for the second valve, and which is simple in structure, light in weight and less costly. In contrast to the applicant's earlier proposal wherein the piston is applied with a thrust after having closed the second valve electromagnetically, the brake actuator according to the present invention does not require the electromagnetic means and ensures a similar operation to be readily achieved, simply by applying a thrust to the piston. Since an electromagnetic operation and a signal processing therefor are unnecessary, furthermore, the required control functions can be performed with an improved response characteristic.

The brake actuator according to the above-mentioned embodiment, in conjunction with the control therefor, makes it possible to accurately reflect convey the driver's intention to the braking force control particularly when, for example, the driver lowers the brake pedal depression force during the anti-skid control. This is due to the arrangement wherein the second valve 22 is subjected to a control by the controller 34 so that it is closed when the thrust to be applied to the piston 9 is at a value other than zero or substantially zero, and wherein the first valve 20 allows a flow of working fluid in the direction toward the master cylinder 2.

The brake actuator according to the present invention is capable of performing the anti-skid control function and the traction control function by a single unit with a simplified and compact arrangement of the driver section for the piston 9. The brake actuator as shown in FIGS. 2, 3 and 4, by way of example, can be used for both driving wheels and driven wheels. In the latter case, it is of course that minor modifications can be readily made with respect to those steps of the control program which are related to the traction control function.

Another embodiment of the present invention is shown in FIG. 8, which differs from the previous embodiment mainly in the arrangement of the second valve 22.

Thus, the valve spool of the second valve 22 and the piston rod of the piston 9 on the side of the valve spool are formed as an integral piece 16a through which a longitudinal passage 22g is formed for establishing a communication between an annular chamber 22h and the first chamber 14 within the control cylinder 8. The annular chamber 22h is defined by a reduced diameter portion of the integral piece 16a. Furthermore, the valve sleeve 22b is formed with a port 22i which can be aligned with the annular chamber 22h. A longitudinal groove 22j is formed along the inner circumferential surface of the sleeve 22b, which cooperates with a space between the piston rod and the end cover 10, for establishing a communication between the annular chamber 22h and the second chamber 15 within the pressure control cylinder 8. The integral piece 16a constituting the piston rod and the valve sleeve is designed so that the annular chamber 22h opens the port 22i when the integral piece 16a assumes its neutral position as shown in FIG. 8. Furthermore, insofar as the actuator body 4A is concerned, the port 21f of the valve section 4B forming the first valve is connected to the first chamber 14 of the pressure control cylinder 8, only.

The brake actuator according to the embodiment of FIG. 8 is otherwise constructed and controlled essentially in the same manner as the previous one. Thus, the brake actuator of this embodiment may incorporate a piston driver section as shown in FIG. 3, and the valve section 4B as shown in FIGS. 4 and 5.

In this embodiment also, the second valve 22 is operated in response to the displacement of the piston 9. Thus, when the thrust F to be applied to the piston is zero, the second chamber 15 within the pressure control cylinder 8 is maintained in communication with the first chamber 14 via the groove 22j, the port 22i, the annular chamber 22h and the passage 22g, so that the first and second chambers 14, 15 are maintained at the same pressure in the neutral position.

When a thrust F is applied to the piston 9 by means of the piston driver section, the valve spool of the second valve 22 is moved out of its neutral position so that the annular chamber 22h is no longer in alignment with the port 22i. The working fluid is thus enclosed in the second chamber 15, and the wheel cylinder pressure can then be either increased (traction control mode) or decreased (anti-skid control mode) in response to the piston displacement, accompanying a decrease or increase in the volume of the second chamber 15.

The brake actuator according to the embodiment shown in FIG. 8, too, is capable of performing the anti-skid control function and the traction control function by a single unit with a simplified and compact arrangement of the driving means for the piston 9. Furthermore, in contrast to the previous embodiment, the present embodiment is particularly advantageous in that the number of ports to be provided for the spool valve can be reduced and the spool valve can be designed to have a smaller axial length. Moreover, formation of the working fluid passages within the piston and/or within the valve sleeve serves to simplify the structure and reduce the number of external pipings.

While the present invention has been explained with reference to certain preferred embodiments only, it is of course that the present invention is not limited to the specific arrangements, and various modifications and/or alterations may be made without departing from the scope of the invention. For example, while the brake actuator of the present invention has been described as being capable of performing both the anti-skid control function and the traction control function, it may be modified to perform either the anti-skid control function or the traction control function, only.

I claim:

1. A hydraulic brake actuator for use in an automobile brake system which includes a master cylinder to be operated by a driver and a wheel cylinder connected to the master cylinder through a hydraulic circuit for applying a braking force to a wheel, said brake actuator being interposed in said hydraulic circuit and comprising:

a control cylinder means having a first chamber connected to said master cylinder, a second chamber which is connected to said wheel cylinder and which can be selectively connected to said master cylinder and disconnected therefrom, and an axially displaceable piston accommodated in said chambers for changing respective volumes of said chambers;

a piston driver means for causing an axial displacement of said piston;

an accumulator means connected to said first chamber; and a valve means having an inlet port connected to said master cylinder, and an outlet port connected to said second chamber, said valve means being operatively connected to said piston so as to be opened or closed in response to the displacement of said piston.

2. The brake actuator as set forth in claim 1, wherein said valve means assumes an open position when said piston is in a neutral position, and assumes a closed position when said piston is moved from said neutral position.

3. The brake actuator as set forth in claim 2, further comprising a centering spring means for resiliently maintaining said piston in said neutral position, said piston drive means being adapted to cause an axial displacement of said piston against said centering spring means.

4. The brake actuator as set forth in claim 1, wherein said valve means comprises a movable valve element which is operatively connected to said piston, and a housing means for accommodating and guiding the valve element therein, said housing means having said inlet and outlet ports and said valve element having a chamber for selectively connecting and disconnecting said inlet and outlet ports to and from each other.

5. The brake actuator as set forth in claim 4, wherein said valve element is a valve spool and said housing means is a valve sleeve, said valve spool being integral with a piston rod for said piston and formed with a longitudinal passage therein for connecting said inlet port with said first chamber.

* * * * *